(12) United States Patent
Tang et al.

(10) Patent No.: US 11,310,684 B2
(45) Date of Patent: Apr. 19, 2022

(54) SIGNAL PROCESSING METHOD AND APPARATUS

(71) Applicant: HUAWEI TECHNOLOGIES CO., LTD., Guangdong (CN)

(72) Inventors: Xun Tang, Beijing (CN); Wei Quan, Beijing (CN); Jian Zhang, Beijing (CN); Li Chai, Shenzhen (CN); Jinhua Miao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 42 days.

(21) Appl. No.: 16/673,565

(22) Filed: Nov. 4, 2019

(65) Prior Publication Data
US 2020/0068423 A1 Feb. 27, 2020

Related U.S. Application Data

(63) Continuation of application No. PCT/CN2017/083356, filed on May 5, 2017.

(51) Int. Cl.
*H04W 24/10* (2009.01)
*H04W 72/04* (2009.01)
(Continued)

(52) U.S. Cl.
CPC ....... *H04W 24/10* (2013.01); *H04W 72/0453* (2013.01); *H04W 72/082* (2013.01); *H04W 72/1231* (2013.01); *H04W 72/1273* (2013.01)

(58) Field of Classification Search
CPC ............ H04W 24/10; H04W 72/0453; H04W 72/082; H04W 72/1231; H04W 72/1273
See application file for complete search history.

(56) References Cited

U.S. PATENT DOCUMENTS

2011/0028181 A1 2/2011 Byun et al.
2012/0322453 A1* 12/2012 Weng ................... H04W 72/02
455/450

(Continued)

FOREIGN PATENT DOCUMENTS

CN 102870466 A 1/2013
CN 103313401 A 9/2013
(Continued)

OTHER PUBLICATIONS

3GPP TS 36.133 V14.3.0 (Mar. 2017), 3 pages (Year: 2017).*
(Continued)

*Primary Examiner* — Sharmin Chowdhury
(74) *Attorney, Agent, or Firm* — Womble Bond Dickinson (US) LLP

(57) ABSTRACT

A signal processing method and an apparatus are provided, and the method includes: measuring, by a terminal device, signal quality of one or more cells, to generate a first measurement report; and sending, by the terminal device,
(Continued)

the first measurement report to a first base station, where the first measurement report includes measurement information of the one or more cells so that the first base station sends the first measurement report to a second base station, and the first base station implements, by using the first measurement report, uplink interference cancellation or downlink interference cancellation for the terminal device.

17 Claims, 6 Drawing Sheets

(51) Int. Cl.
  *H04W 72/08* (2009.01)
  *H04W 72/12* (2009.01)

(56) References Cited

U.S. PATENT DOCUMENTS

| | | | | |
|---|---|---|---|---|
| 2013/0121191 | A1* | 5/2013 | Song | H04W 36/08 370/252 |
| 2013/0301528 | A1* | 11/2013 | Takahashi | H04W 72/082 370/328 |
| 2014/0274061 | A1 | 9/2014 | Yao | |
| 2015/0065140 | A1 | 3/2015 | Zhi et al. | |
| 2015/0271713 | A1 | 9/2015 | Kim et al. | |
| 2015/0303958 | A1* | 10/2015 | Davydov | H04L 5/0058 375/341 |
| 2016/0255613 | A1* | 9/2016 | Faerber | H04W 16/10 370/330 |
| 2017/0055186 | A1* | 2/2017 | Donepudi | H04W 36/0083 |
| 2017/0208643 | A1 | 7/2017 | Kim et al. | |
| 2018/0199242 | A1* | 7/2018 | Deng | H04W 36/0038 |
| 2020/0100187 | A1* | 3/2020 | Balasubramanian | B64C 39/024 |

FOREIGN PATENT DOCUMENTS

| | | |
|---|---|---|
| CN | 103701572 A | 4/2014 |
| CN | 104054372 A | 9/2014 |
| CN | 105764061 A | 7/2016 |
| CN | 106068658 A | 11/2016 |
| EP | 2028907 A1 | 2/2009 |
| EP | 2978258 A1 | 1/2016 |
| EP | 2993937 A1 | 3/2016 |
| WO | 2012000177 A1 | 1/2012 |
| WO | 2015180078 A1 | 12/2015 |

OTHER PUBLICATIONS

KDDI Corporation,"Field measurement results for drone LTE enhancement",3GPP TSG-RAN WG1 Meeting 88bis, R1-1705823,Spokane, USA, Apr. 3-7, 2017, total 6 pages.
3GPP TS 36.331 V14.2.2 (Apr. 2017),3rd Generation Partnership Project;Technical Specification Group Radio Access Network;Evolved Universal Terrestrial Radio Access (E-UTRA); Radio Resource Control (RRC);Protocol specification (Release 14), total 720 pages.
3GPP TS 36.300 V14.2.0 (Mar. 2017),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14), total 330 pages.

* cited by examiner

SIGNAL PROCESSING METHOD AND APPARATUS

CROSS-REFERENCE TO RELATED APPLICATIONS

This application is a continuation of International Application No. PCT/CN2017/083356, filed on May 5, 2017, the disclosure of which is incorporated herein by reference in its entirety.

TECHNICAL FIELD

This application relates to the field of communications technologies, and in particular, to a signal processing method and an apparatus.

BACKGROUND

In the beginning of design, a cellular communications system is intended only for a ground terminal; to be specific, a signal radiation direction of a base station is toward the ground. With mature development of drone technologies, a price of a drone continues to decline, and an application of the drone gradually becomes wider, and a requirement for a long-distance flight of the drone is gradually raised. However, flight of most of existing consumer-grade drones is operated by a remote control, and therefore the drones can fly only within a line-of-sight range.

If a terrestrial cellular communications network can support the drone, a drone flight control command can implement over-the-horizon long-distance transmission, helping the drone implement long-distance flight. In addition, information such as pictures or videos captured by the drone can also be returned in real time, thereby greatly facilitating development of the drone industry.

If a flight height of the drone does not exceed a height of the base station, the drone may be considered as a common terminal. If a flight height of the drone is greater than a height of the base station, two problems are generated:

1. Quality of a downlink signal received by the drone deteriorates.

On one hand, a signal radiation direction of a base station is mainly toward the ground. Although some signals are diffused into the air due to reflection or scattering of a ground signal, or some side lobes of a base station antenna radiate into the air, generally, strength of a signal received by the drone in the air is relatively low. On the other hand, after the flight height of the drone exceeds the height of the base station, the drone can observe more base stations, that is, receive signals of a plurality of other base stations, thereby increasing interference in a downlink direction. Therefore, based on the foregoing two reasons, signal quality of a drone terminal in a downlink direction apparently deteriorates.

2. An uplink signal sent by the drone generates a large amount of uplink interference.

Because the drone observes more base stations, the uplink signal sent by the drone is also received by more base stations. This causes uplink interference to the base stations.

As shown in FIG. 1, a drone terminal communicates with a serving base station; however, because a height increases, the drone terminal can receive downlink signals of an interfering base station 1 and an interfering base station 2. In addition, the uplink signal sent by the drone terminal to the serving base station is also received by the interfering base station 1 and the interfering base station 2.

In conclusion, there is no optimal design for the drone terminal in an existing cellular network. Consequently, the drone terminal receives a large amount of downlink interference, and the drone terminal also causes severe uplink interference to a surrounding base station.

SUMMARY

Embodiments of this application provide a signal processing method and an apparatus, to resolve an existing problem that severe uplink and downlink interference occurs during communication of a drone terminal.

According to a first aspect, a signal processing method is provided, including:

measuring, by a terminal device, signal quality of one or more cells, to generate a first measurement report; and sending, by the terminal device, the first measurement report to a first base station, where the first measurement report includes measurement information of the one or more cells.

In this design, by using the foregoing signal processing method, for downlink measurement, the terminal device can identify signals of a plurality of cells above a specific flight height. The terminal device may include measurement results of signal quality of the cells in the first measurement report, and sends the first measurement report to the first base station, to perform downlink interference cancellation.

With reference to the first aspect, in one embodiment, the generating, by a terminal device, a first measurement report includes:

generating, by the terminal device, the first measurement report based on measurement report configuration information, where the measurement report configuration information includes at least one signal quality level.

In this embodiment, the terminal device generates, based on the measurement report configuration information, the first measurement report that includes at least one signal quality level, to obtain a balance between integrity of reported information and a data volume of a measurement report, and reduce system overheads.

With reference to the first aspect, in one embodiment, the measurement report configuration information further includes a signal quality range corresponding to each of the at least one signal quality level and/or level configuration information corresponding to each of the at least one signal quality level, and the level configuration information is used to indicate measurement information that needs to be reported.

In this embodiment, because the measurement report configuration information further includes a signal quality range corresponding to each of the at least one signal quality level and/or level configuration information corresponding to each of the at least one signal quality level, a more concerned neighboring cell can be screened out based on the measurement report configuration information, and screening of the neighboring cell is more flexible and changeable.

With reference to the first aspect, in one embodiment, the measurement report configuration information is received by the terminal device from the first base station, or the measurement report configuration information is preconfigured.

With reference to the first aspect, in one embodiment, the measurement information includes any one of a signal quality level and signal quality; and a correspondence between the signal quality and the signal quality level is preset, or a correspondence is received by the terminal device from the first base station.

In this embodiment, the measurement information can be randomly selected from the signal quality level and the signal quality, to ensure integrity of reported information.

With reference to the first aspect, in one embodiment, the first measurement report further includes a cell quantity and/or a cell ID corresponding to each signal quality level.

With reference to the first aspect, in one embodiment, the method further includes:

receiving, by the terminal device, first downlink scheduling information from the first base station; or determining, by the terminal device, the first downlink scheduling information by using first identification information, where the first downlink scheduling information is scheduling information of a neighboring cell, and the first identification information is received by the terminal device from the first base station, or the first identification information is determined by the terminal device based on indication information received from the first base station.

In this embodiment, by using the foregoing signal processing method, for downlink measurement, the terminal device can identify signals of a plurality of cells above a specific flight height. The terminal device may include measurement results of signal quality of the cells in the first measurement report, and sends the first measurement report to the first base station, to perform downlink interference cancellation.

With reference to the first aspect, in one embodiment, the determining, by the terminal device, the first downlink scheduling information by using first identification information includes:

detecting, by the terminal device, the first identification information on a control channel, to determine the first downlink scheduling information.

In this embodiment, by using the foregoing signal processing method, for downlink measurement, the terminal device can identify signals of a plurality of cells above a specific flight height. The terminal device may include measurement results of signal quality of the cells in the first measurement report, and sends the first measurement report to the first base station, to perform downlink interference cancellation.

According to a second aspect, a signal processing method is provided, including:

receiving, by a first base station, a first measurement report from a terminal device, where the first measurement report includes measurement information of one or more cells; and sending, by the first base station, the first measurement report to a second base station, where the second base station is a neighboring base station of the first base station.

In this embodiment, the second base station performs, based on the first measurement report, interference detection or cancellation on the terminal device.

With reference to the second aspect, in one embodiment, the method further includes:

sending, by the first base station, uplink resource configuration information to the second base station, where the uplink resource configuration information includes at least one of resource block RB location information, a modulation and coding scheme (MCS), and a frequency hopping indication.

In this embodiment, the first base station sends uplink resource configuration information to the second base station, where the uplink resource configuration information may be uplink data scheduling information, and includes at least one of RB location information, an MCS, and a frequency hopping indication. The uplink resource configuration information may also be uplink reference signal configuration information, for example, resource configuration information of a sounding reference signal. In this way, the second base station performs, based on the uplink resource configuration information, uplink interference detection or cancellation on the terminal device.

With reference to the second aspect, in one embodiment, the method further includes:

sending, by the first base station, a resource scheduling request to the second base station, where the resource scheduling request is used to request downlink resource scheduling information from the second base station; and receiving, by the first base station, first downlink resource scheduling information from the second base station.

In this design, the first base station sends obtained downlink resource scheduling information to the terminal device, and the terminal device implements downlink interference cancellation by using the downlink resource scheduling information.

With reference to the second aspect, in one embodiment, the method further includes:

sending, by the first base station, the first downlink resource scheduling information to the terminal device, where the first downlink resource scheduling information includes downlink resource scheduling information of the second base station.

With reference to the second aspect, in one embodiment, the method further includes:

the first downlink resource scheduling information further includes downlink resource scheduling information of a third base station, and the third base station is determined by the second base station based on the first measurement report.

With reference to the second aspect, in one embodiment, the method further includes:

determining, by the first base station, the second base station based on the first measurement report.

With reference to the second aspect, in one embodiment, the first base station determines at least one cell of the one or more cells based on the first measurement report; and the first base station determines the second base station based on the at least one cell.

With reference to the second aspect, in one embodiment, the measurement information includes any one of a signal quality level and signal quality; and a correspondence between the signal quality and the signal quality level is preset, or a correspondence is received by the terminal device from the first base station.

With reference to the second aspect, in one embodiment, the first measurement report further includes a cell quantity and/or a cell ID corresponding to each signal quality level.

According to a third aspect, a signal processing method is provided, including:

receiving, by a second base station, a first measurement report from a first base station, where the first measurement report includes measurement information of at least one cell, and the second base station is a neighboring base station of the first base station; and determining, by the second base station, at least one third base station based on the first measurement report.

In this embodiment, the second base station determines at least one third base station based on the first measurement report, and the third base station detects, by using the first measurement report, whether a cell with strong interference exists, to eliminate uplink interference caused by a cell subordinate to the third base station to the terminal device.

With reference to the third aspect, in one embodiment, the first measurement report includes signal quality of at least one cell, and the determining, by the second base station, at least one third base station based on the first measurement report includes:

determining, by the second base station, at least one cell whose signal quality exceeds a preset threshold as a target cell; and determining, by the second base station, a base station of the target cell as a third base station.

With reference to the third aspect, in one embodiment, the first measurement report includes a signal quality level of at least one cell, and the determining, by the second base station, at least one third base station based on the first measurement report includes:

determining, by the second base station, at least one cell whose signal quality level exceeds a preset threshold as a target cell; and determining, by the second base station, a base station of the target cell as a third base station.

With reference to the third aspect, in one embodiment, the method further includes:

receiving, by the second base station, uplink resource configuration information from the first base station, where the uplink resource configuration information is reference signal configuration information or uplink data scheduling information; and sending, by the second base station, the uplink resource configuration information to the third base station.

In one embodiment, the third base station detects, by using the reference signal configuration information or the uplink data scheduling information, whether a cell with strong interference exists, to eliminate uplink interference caused by a cell subordinate to the third base station to the terminal device.

With reference to the third aspect, in one embodiment, the method further includes:

receiving, by the second base station, a resource scheduling request from the first base station, where the resource scheduling request is used to request downlink resource scheduling information; and sending, by the second base station, downlink resource scheduling information of the second base station and/or downlink resource scheduling information of the third base station to the first base station.

In this embodiment, the first base station can send the downlink resource scheduling information to the terminal device, so that the terminal device eliminates downlink interference.

According to a fourth aspect, a terminal device is provided, including:

a processing module, configured to measure signal quality of one or more cells, to generate a first measurement report; and a sending module, configured to send the first measurement report to a first base station, where the first measurement report includes measurement information of the one or more cells.

With reference to the fourth aspect, in one embodiment, the processing module is specifically configured to:

generate the first measurement report based on measurement report configuration information, where the measurement report configuration information includes at least one signal quality level.

With reference to the fourth aspect, in one embodiment, the measurement report configuration information further includes a signal quality range corresponding to each of the at least one signal quality level and/or level configuration information corresponding to each of the at least one signal quality level, and the level configuration information is used to indicate measurement information that needs to be reported.

With reference to the fourth aspect, in one embodiment, the measurement report configuration information is received by the terminal device from the first base station, or the measurement report configuration information is preconfigured.

With reference to the fourth aspect, in one embodiment, the measurement information includes any one of a signal quality level and signal quality; and a correspondence between the signal quality and the signal quality level is preset, or a correspondence is received by the terminal device from the first base station.

With reference to the fourth aspect, in one embodiment, the first measurement report further includes a cell quantity and/or a cell ID corresponding to each signal quality level.

With reference to the fourth aspect, in one embodiment, the terminal device further includes a receiving module, configured to:

receive first downlink scheduling information from the first base station; and the processing module is further configured to determine the first downlink scheduling information by using first identification information, where the first downlink scheduling information is scheduling information of a neighboring cell, and the first identification information is received by the receiving module from the first base station, or the first identification information is determined by the processing module based on indication information received from the first base station.

With reference to the fourth aspect, in one embodiment, the processing module is specifically configured to:

detect the first identification information on a control channel, to determine the first downlink scheduling information.

In another aspect, in the foregoing embodiment, a physical device corresponding to the processing module may be a processor, a physical device corresponding to the sending module may be a transmitter, and a physical device corresponding to the receiving module may be a receiver.

According to a fifth aspect, a first base station is provided, including:

a receiving module, configured to receive a first measurement report from a terminal device, where the first measurement report includes measurement information of one or more cells; and a sending module, configured to send the first measurement report to a second base station, where the second base station is a neighboring base station of the first base station.

With reference to the fifth aspect, in one embodiment, the sending module is further configured to:

send uplink resource configuration information to the second base station, where the uplink resource configuration information includes at least one of resource block RB location information, a modulation and coding scheme (MCS), and a frequency hopping indication.

With reference to the fifth aspect, in one embodiment, the sending module is further configured to:

send a resource scheduling request to the second base station, where the resource scheduling request is used to request downlink resource scheduling information from the second base station; and receive first downlink resource scheduling information from the second base station.

With reference to the fifth aspect, in one embodiment, the sending module is further configured to:

send the first downlink resource scheduling information to the terminal device, where the first downlink resource scheduling information includes downlink resource scheduling information of the second base station.

With reference to the fifth aspect, in one embodiment, the first downlink resource scheduling information further includes downlink resource scheduling information of a third base station, and the third base station is determined by the second base station based on the first measurement report.

With reference to the fifth aspect, in one embodiment, the first base station further includes a processing module, configured to:

determine the second base station based on the first measurement report.

With reference to the fifth aspect, in one embodiment, the processing module is specifically configured to:

determine at least one cell of the one or more cells based on the first measurement report; and determine the second base station based on the at least one cell.

With reference to the fifth aspect, in one embodiment, the measurement information includes any one of a signal quality level and signal quality; and a correspondence between the signal quality and the signal quality level is preset, or a correspondence is received by the terminal device from the first base station.

With reference to the fifth aspect, in one embodiment, the first measurement report further includes a cell quantity and/or a cell ID corresponding to each signal quality level.

In another aspect, in the foregoing embodiment, a physical device corresponding to the processing module may be a processor, a physical device corresponding to the sending module may be a transmitter, and a physical device corresponding to the receiving module may be a receiver.

According to a sixth aspect, a second base station is provided, including:

a receiving module, configured to receive a first measurement report from a first base station, where the first measurement report includes measurement information of at least one cell, and the second base station is a neighboring base station of the first base station; and a processing module, configured to determine at least one third base station based on the first measurement report.

With reference to the sixth aspect, in one embodiment, the first measurement report includes signal quality of the at least one cell, and the processing module is specifically configured to:

determine at least one cell whose signal quality exceeds a preset threshold as a target cell; and determine a base station of the target cell as a third base station.

With reference to the sixth aspect, in one embodiment, the first measurement report includes a signal quality level of the at least one cell, and the processing module is specifically configured to:

determine at least one cell whose signal quality level exceeds a preset threshold as a target cell; and determine a base station of the target cell as a third base station.

With reference to the sixth aspect, in one embodiment, the receiving module is further configured to:

receive uplink resource configuration information from the first base station, where the uplink resource configuration information is reference signal configuration information or uplink data scheduling information; and the second base station further includes a sending module, configured to send the uplink resource configuration information to the third base station.

With reference to the sixth aspect, in one embodiment, the receiving module is further configured to:

receive a resource scheduling request from the first base station, where the resource scheduling request is used to request downlink resource scheduling information; and the sending module is further configured to send downlink resource scheduling information of the second base station and/or downlink resource scheduling information of the third base station to the first base station.

In another aspect, in the foregoing embodiment, a physical device corresponding to the processing module may be a processor, a physical device corresponding to the sending module may be a transmitter, and a physical device corresponding to the receiving module may be a receiver.

According to a seventh aspect, a communications system is provided, including the terminal device, the first base station, and the second base station used in the foregoing embodiments.

According to an eighth aspect, a computer storage medium is provided. The computer storage medium is configured to store a computer software instruction used by the foregoing terminal device, and the computer software instruction includes a program designed to execute the foregoing aspects.

According to a ninth aspect, a computer storage medium is provided. The computer storage medium is configured to store a computer software instruction used by the foregoing first base station, and the computer software instruction includes a program designed to execute the foregoing aspects.

According to a tenth aspect, a computer storage medium is provided. The computer storage medium is configured to store a computer software instruction used by the second base station, and the computer software instruction includes a program designed to execute the foregoing aspects.

According to an eleventh aspect, a computer program product including an instruction is provided; when the computer program product is run on a computer, the computer is enabled to perform the methods in the foregoing aspects.

DESCRIPTION OF EMBODIMENTS

Figure 1:
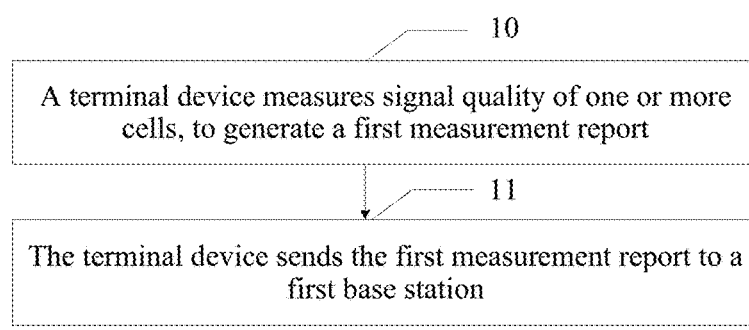
FIG. 1 is a schematic flowchart of a signal processing method according to an embodiment of this application.

The following clearly describes the technical solutions in the embodiments of this application with reference to the accompanying drawings in the embodiments of this application.

The term "and/or" in the embodiments of this application describes only an association relationship for describing associated objects and represents that three relationships may exist. For example, A and/or B may represent the following three cases: Only A exists, both A and B exist, and only B exists. In addition, the character "/" in the embodiments of this application generally indicates an "or" relationship between the associated objects.

"A plurality of" means two or more than two.

In addition, it should be understood that, in the description of this application, terms such as "first" and "second" are used only for distinguishing between descriptions, but cannot be understood as an indication or implication of relative importance, and cannot be understood as an indication or implication of a sequence.

A signal processing method in the embodiments of this application is applicable to a long term evolution (LTE) system or a 5G system; in addition, a paging method in the embodiments of this application may also be applicable to another wireless communications system, such as a global system for mobile communications (GSM), a universal mobile telecommunications system (UMTS), a code division multiple access (or a new network system.

A base station in the embodiments of this application may be configured to perform mutual conversion between a received over-the-air frame and an Internet protocol (IP) packet, and be used as a router between a wireless terminal device and a remaining part of an access network, where the remaining part of the access network may include an IP network. In addition, the base station in the embodiments of this application may further coordinate attribute management on an air interface. For example, the base station in the embodiments of this application may be a base station (BTS) in a global system for mobile communications (GSM) or code division multiple access (CDMA), or may be a NodeB in wideband code division multiple access (WCDMA), or may be an evolved NodeB (eNB or e-NodeB) in LTE, or may be a gNB in a 5G system, or a central unit or a data unit in a 5G system. This is not limited in the embodiments of this application.

A terminal device in the embodiments of this application may be a device that provides a user with voice and/or data connectivity, a handheld device with a wireless connection function, or another processing device connected to a wireless modem. The terminal device may also be a wireless terminal device. The wireless terminal device may communicate with one or more core networks by using a radio access network (RAN). The wireless terminal device may be a mobile terminal device, such as a mobile phone (also referred to as a "cellular" phone) and a computer with a mobile terminal device. The computer with a mobile terminal device may be, for example, a portable, pocket-sized, handheld, computer built-in, or in-vehicle mobile apparatus, which exchanges voice and/or data with the radio access network. For example, the wireless terminal device may also be a device such as a personal communication service (PCS) phone, a cordless telephone set, a session initiation protocol (SIP) phone, a wireless local loop (WLL) station, or a personal digital assistant (PDA). The wireless terminal device may also be referred to as a system, a subscriber unit, a subscriber station, a mobile station, a mobile console, a remote station, an access point, a remote terminal device, an access terminal device a user terminal device, a user agent, a user device, or user equipment (UE). Optionally, the terminal device may be a drone, or may be another device that has a flight capability, such as an intelligent robot or a hot air balloon.

In the embodiments of this application, a first base station is a serving base station of a terminal device, a second base station is a neighboring base station of the first base station, and a third base station is a peripheral base station of the first base station, and is usually a neighboring base station of the second base station.

Embodiments of this application provide a signal processing method and an apparatus, to resolve an existing problem that severe uplink and downlink interference occurs during communication of a drone terminal. The method and the apparatus are based on a same inventive concept. The method and the apparatus have similar problem-resolving principles. Therefore, for implementation of the apparatus and the method, reference may be made to each other, and details of repeated parts are not described.

FIG. 1 is a schematic flowchart of a signal processing method according to an embodiment of this application, and this procedure may be specifically implemented by using hardware, software programming, or a combination of software and hardware.

The terminal device may be configured to execute the procedure shown in FIG. 1. A functional module that is in the terminal device and that is configured to execute a signal processing solution provided in embodiments of the present invention may be specifically implemented by using hardware, software programming, and a combination of software and hardware. The hardware may include one or more signal processing and/or application-specific integrated circuits.

As shown in FIG. 1, the procedure specifically includes the following operations.

Operation 10: A terminal device measures signal quality of one or more cells, to generate a first measurement report.

Specifically, the terminal device may generate the first measurement report by using the following operations.

The terminal device generates the first measurement report based on measurement report configuration information, where the measurement report configuration information is received by the terminal device from the first base station, or the measurement report configuration information is preconfigured.

The measurement report configuration information includes at least one signal quality level.

In one embodiment, the measurement report configuration information further includes a signal quality range corresponding to each of the at least one signal quality level and/or level configuration information corresponding to each of the at least one signal quality level, and the level configuration information is used to indicate measurement information that needs to be reported.

The level configuration information is used to indicate at least one of a cell quantity, a cell ID, and signal quality that correspond to each level and that need to be reported.

The measurement information includes any one of a signal quality level and signal quality.

A correspondence between the signal quality and the signal quality level is preset, or a correspondence is received by the terminal device from the first base station.

For downlink measurement, a terminal device such as a drone terminal can identify signals of a plurality of cells above a specific flight height, and the terminal device may include measurement information of the cells in the first measurement report and send the first measurement report to the first base station. A quantity of neighboring cells included in a single measurement report may be limited. Therefore, the terminal device may perform reporting for a plurality of times to complete reporting of all detected cells. When the quantity of neighboring cells in a single report is increased, a data volume of a measurement report is increased, and system overheads are increased. Therefore, to obtain a balance between integrity of reported information and the data volume of the measurement report, the first measurement report in this embodiment includes level information of signal quality of the at least one cell, and a correspondence between the signal quality and the level information is preset, or a correspondence is received by the terminal device from the first base station.

Specifically, in one embodiment, the first base station preconfigures level thresholds for reporting signal quality for the terminal device. An example in which a signal quality indicator value is reference signal received power (RSRP) is used. It should be noted that the following description is also applicable to reference signal received quality (RSRQ). RSRP ranges corresponding to all levels are shown in Table 1.

TABLE 1

| Level | Range |
|---|---|
| 1 | RSRP >=−70 dBm |
| 2 | −80 dBm <= RSRP < −70 dBm |
| 3 | −90 dBm <= RSRP < −80 dBm |
| 4 | −100 dBm <= RSRP < −90 dBm |
| 5 | RSRP <−100 dBm |

In one embodiment, the first measurement report further includes a cell quantity and/or a cell identifier (cell ID) corresponding to each signal quality level, where the cell ID may be a physical cell identifier (PCI) or a globally unique cell identifier (E-UTRAN Cell Global Identifier or ECGI). For example, the terminal device obtains RSRP results of a plurality of cells through measurement, classifies the RSRP results based on the foregoing range values, and reports a cell quantity and a cell ID of each level. In one embodiment, the terminal device may further report specific measurement results of some cells, namely, signal quality. For example, cell 1 RSRP=−74 dBm, cell 2 RSRP=−84 dBm, and cell 3 RSRP=−88 dBm. A reported measurement result of the first measurement report is shown in Table 2, where a specific RSRP value is reported only for a cell of level 2, and another cell has only a cell ID.

TABLE 2

| Level | Cell quantity and cell ID |
|---|---|
| 1 | 0 |
| 2 | 1 (cell 1, RSRP = −74 dBm) |
| 3 | 2 (cell 2, cell 3) |
| 4 | 0 |
| 5 | 0 |

For a case in which a plurality of cells are detected and need to be reported, a reporting condition of the first measurement report may be further restricted to screen out a more concerned neighboring cell. For example, the RSRP and the RSRQ may be used for combined screening, to separately delimit a level range. Reporting of a measurement result is allowed only when the two indicators both meet a preset condition. To be specific, the cell measurement result may need to meet both of the following two conditions to trigger reporting of the first measurement report. A possible determining condition is as follows: For example, at least one threshold of a threshold 1, a threshold 2, a threshold 3, a threshold 4, and the like is defined, and whether to trigger reporting of the first measurement report is determined by comparing the threshold with an RSRP value.

For example, threshold 1<=RSRP value<threshold 2, and threshold 3<=RSRQ value<threshold 4; or threshold 1<=RSRP value, and RSRQ value<threshold 4; or RSRP value<threshold 2, and threshold 3<=RSRQ value.

Operation 11: The terminal device sends the first measurement report to a first base station.

In one embodiment, the terminal device receives first downlink scheduling information from the first base station; or the terminal device determines the first downlink scheduling information by using first identification information, where the first downlink scheduling information is scheduling information of a neighboring cell. The neighboring cell herein is a cell other than a serving cell of the terminal device. The first identification information is received by the terminal device from the first base station, or the first identification information is determined by the terminal device based on indication information received from the first base station, where the first identification information is carried in the indication information, or the indication information is used to indicate a location of the first identification information.

Specifically, the first identification information is a dedicated radio network temporary identifier (RNTI), and the determining, by the terminal device, the first downlink scheduling information by using first identification information includes: detecting, by the terminal device, a physical downlink control channel (PDCCH) based on the dedicated RNTI to obtain the first downlink scheduling information.

By using the foregoing signal processing method, for downlink measurement, the terminal device can identify signals of a plurality of cells above a specific flight height. The terminal device may include measurement results of signal quality of the cells in the first measurement report, and may send the first measurement report to the first base station, to eliminate downlink interference.

Figure 2:
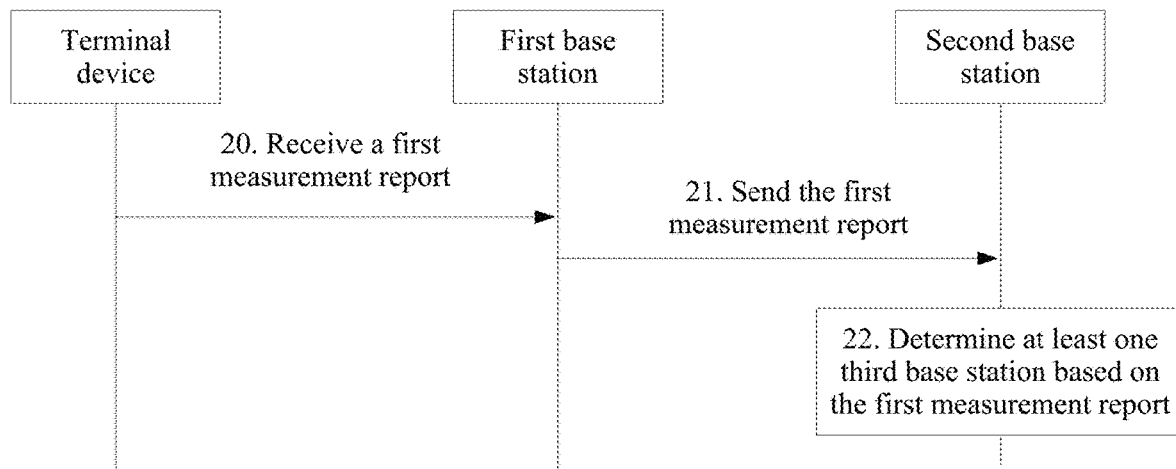
FIG. 2 is a signal flow diagram of a signal processing method according to an embodiment of this application.

FIG. 2 is a signal flow diagram of a signal processing method according to an embodiment of this application. This procedure may be specifically implemented by using hardware, software programming, or a combination of software and hardware.

A base station is configured to execute the procedure shown in FIG. 2. A functional module that is in the base device and that is configured to execute a signal processing solution provided in this embodiment of the present invention may be specifically implemented by using hardware, software programming, and a combination of software and hardware. The hardware may include one or more signal processing and/or application-specific integrated circuits.

As shown in FIG. 2, the procedure specifically includes the following operations.

Operation 20: A first base station receives a first measurement report from a terminal device, where the first measurement report includes measurement information of one or more cells.

In one embodiment, the measurement information of the cell may be signal quality of the cell. In one embodiment, the first measurement report includes level information of signal quality of the at least one cell, and a correspondence between the signal quality and the level information is preset, or a correspondence is received by the terminal device from the first base station. Further, the first measurement report further includes a cell quantity and/or a cell ID corresponding to each level.

Operation 21: The first base station sends the first measurement report to a second base station, where the second base station is a neighboring base station of the first base station.

The first base station determines at least one cell of the one or more cells based on the first measurement report.

The first base station determines the second base station based on the at least one cell.

It should be noted that there may be one or more second base stations, and the second base station is a serving base station of the at least one cell. When there is one second base station, the second base station may be a first base station, and when there are a plurality of second base stations, the second base stations may include the first base station.

In one embodiment, the first base station sends uplink resource configuration information to the second base station, where the uplink resource configuration information may be uplink data scheduling information, and includes at least one of RB location information, an MCS, and a frequency hopping indication. The uplink resource configuration information may also be uplink reference signal configuration information, for example, resource configuration information of a sounding reference signal. In this way, the second base station performs, based on the uplink resource configuration information, uplink interference detection or cancellation on the terminal device.

It should be noted that the first measurement report and the uplink resource configuration information may be separately sent or simultaneously sent.

In one embodiment, the first base station sends a resource scheduling request to the second base station, the first base station receives first downlink resource scheduling information from the second base station, and the resource scheduling request is used to request the first downlink resource scheduling information from the second base station, so that the first base station sends obtained downlink resource scheduling information to the terminal device, and the terminal device implements downlink interference cancellation by using the downlink resource scheduling information.

It should be noted that the downlink resource scheduling information of the base station includes downlink resource scheduling information of at least one cell served by the base station.

In one embodiment, the first base station sends the first downlink resource scheduling information to the terminal device, where the first downlink resource scheduling information includes downlink resource scheduling information of the second base station.

In one embodiment, the first downlink resource scheduling information further includes downlink resource scheduling information of a third base station, and the third base station is determined by the second base station based on the first measurement report.

Operation 22: The second base station determines at least one third base station based on the first measurement report.

Specifically, the first measurement report includes signal quality of at least one cell or a signal quality level of at least one cell. A manner in which the second base station determines the at least one third base station based on the first measurement report is similar to a manner in which the first base station determines the second base station, and may be implemented by using the following operations.

Operation S1: The second base station determines at least one cell whose signal quality or signal quality level exceeds a preset threshold as a target cell.

Operation S2: The second base station determines a base station of the target cell as a third base station.

In one embodiment, the second base station receives uplink resource configuration information from the first base station, and the second base station sends the uplink resource configuration information to the third base station, where the uplink resource configuration information is reference signal configuration information or uplink data scheduling information; and the second base station sends the uplink resource configuration information to the third base station. In this embodiment, the third base station detects, by using the reference signal configuration information or the uplink data scheduling information, whether a cell with strong interference exists, to eliminate uplink interference caused by the terminal device to a cell subordinate to the third base station. The cell subordinate to the third base station may also be understood as one or more cells served by the third base station or one or more cells in a coverage area of the third base station.

In one embodiment, the second base station receives a resource scheduling request from the first base station, where the resource scheduling request is used to request downlink resource scheduling information; and the second base station sends downlink resource scheduling information of the second base station and/or downlink resource scheduling information of the third base station to the first base station. The downlink resource scheduling information of the second base station and the downlink resource scheduling information of the third base station may be separately sent, or may be simultaneously sent. In this implementation, the first base station can send the downlink resource scheduling information to the terminal device, so that the terminal device eliminates downlink interference.

It should be noted that the downlink resource scheduling information includes dynamic resource scheduling information and/or semi-static resource scheduling information; the uplink resource configuration information includes dynamic resource configuration information and/or semi-static resource configuration information.

In one embodiment, all downlink resources that are allocated by the first base station to the terminal device are semi-static, to be specific, periodically configured. In addition, a same time resource and a same frequency resource are reserved by the second base station, and may be allocated to a possible terminal device or not allocated to any terminal device for use. In this manner, the first base station may send the semi-static downlink resource scheduling information of the terminal device to the second base station.

Figure 3A:
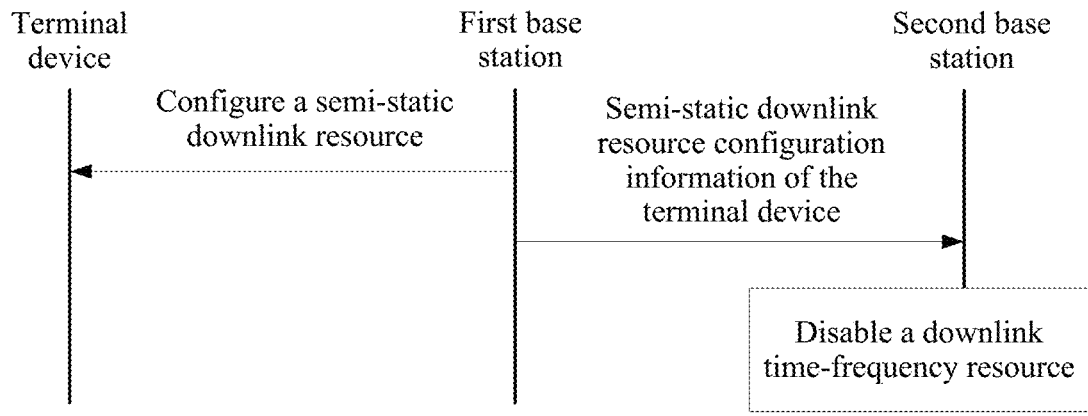
FIG. 3a and FIG. 3b are signal flow diagrams of a process of configuring a semi-static downlink resource for a terminal device.

As shown in FIG. 3a, the first base station configures a semi-static downlink resource for the terminal device, sends configuration information of the semi-static downlink resource to an adjacent second base station, and indicates that a cell of the second base station causes downlink interference to the terminal device. After receiving the indication information, the second base station may disable a related time-frequency resource in the interfering cell to avoid causing downlink interference to the terminal device. This manner is also applicable to a scenario in which the terminal device uses dynamic scheduling.

Figure 3B:
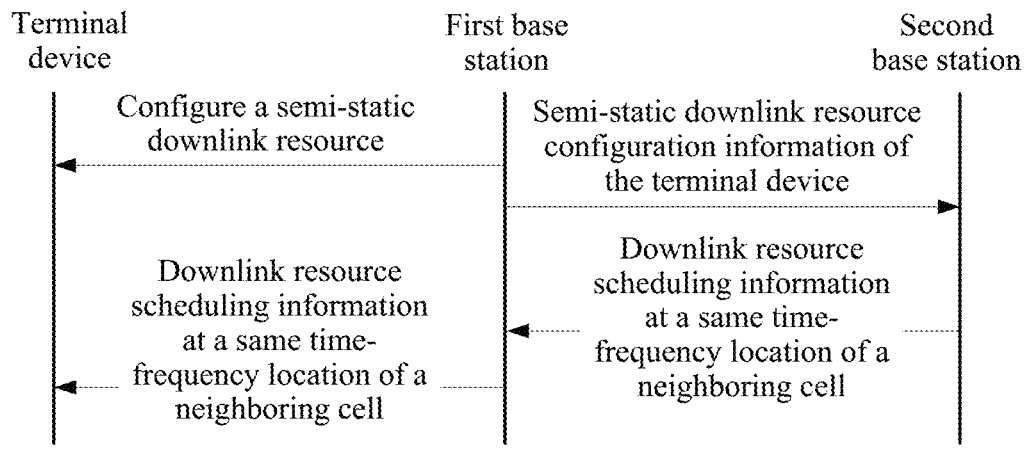

Alternatively, as shown in FIG. 3b, the second base station allocates the time-frequency resource to the terminal device of the cell in a semi-persistent scheduling mode, and feeds back the downlink resource scheduling information to the first base station, and then the first base station sends the downlink resource scheduling information to the terminal device, to perform downlink interference cancellation.

The following describes the foregoing signal processing method in detail by using several embodiments.

Embodiment 1 is a downlink interference cancellation solution.

Figure 4:
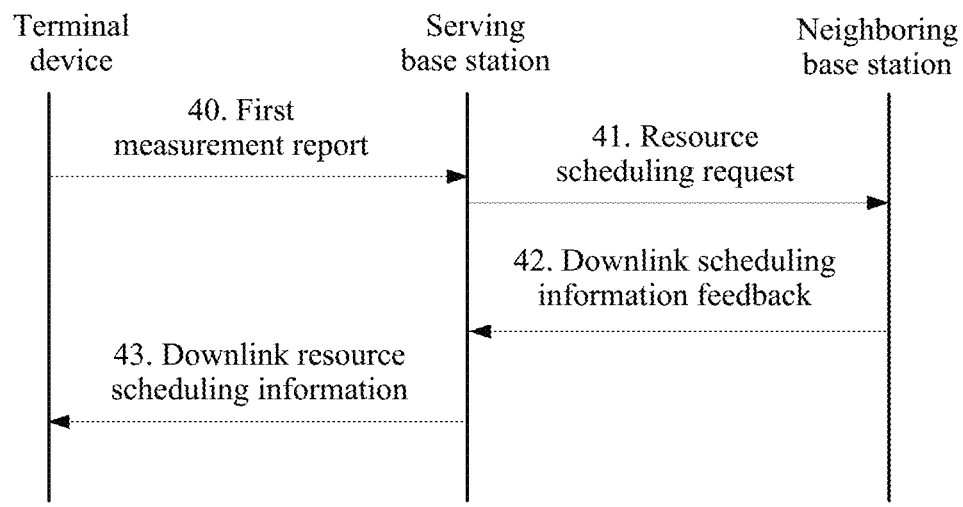
FIG. 4 is a signal flow diagram of a signal processing method for downlink interference cancellation.

Referring to FIG. 4, a specific procedure includes the following operations.

Operation 40: The terminal device measures a reference signal of at least one cell to obtain signal quality of the at least one cell, and reports the signal quality to a serving base station by using the first measurement report.

The first measurement report includes a PCI or an ECGI, and downlink signal quality of the cell. In one embodiment, the downlink signal quality may be an RSRP, an RSRQ, or the like. In one embodiment, the first measurement report includes level information of signal quality of at least one cell, and a correspondence between the signal quality and the level information is preset, or a correspondence is received by the terminal device from the serving base station.

Operation 41: After receiving the first measurement report, the serving base station determines, based on the signal quality of the at least one cell included in the first measurement report, whether each cell is a strong interfering cell, and then sends a resource scheduling request to a neighboring base station of the strong interfering cell, to request to obtain downlink resource scheduling information of a neighboring base station and/or downlink resource scheduling information of a peripheral base station.

Operation 42: The serving base station receives downlink resource scheduling information fed back by a neighboring base station.

The downlink resource scheduling information includes downlink resource scheduling information of a neighboring base station and/or downlink resource scheduling information of a peripheral base station.

Operation 43: The serving base station sends the downlink resource scheduling information to the terminal device.

After the downlink resource scheduling information arrives at the serving base station, the downlink resource scheduling information may be sent to the terminal device, to perform interference cancellation. Specifically, a neighboring base station sends scheduling information of all frequency domain resources on each subframe to the serving base station, and the serving base station may send neighboring cell scheduling information on a resource occupied by a terminal device to the terminal device. For example, the terminal device occupies an RB 10 to an RB 20 on a subframe of SFN=0 and subframe=1. Corresponding downlink resource scheduling information covers the time-frequency resource, for example, two groups of scheduling information that include RB 5 to RB 15 and RB 16 to RB 30. The downlink resource scheduling information may include the following information: a modulation and coding scheme (MCS), a resource block (RB) location, a cell radio network temporary identity (C-RNTI), a redundancy version, a transmit mode, demodulation reference signal (DMRS) pilot resource information, and the like.

It should be noted that when the downlink resource scheduling information and data of the terminal device are combined and sent together, effective data detection may not be implemented due to interference. Therefore, a feasible method is that the downlink resource scheduling information and the data of the terminal device are separately sent.

Specifically, the serving base station sends the downlink resource scheduling information to the terminal device at a low bit rate, to ensure that the terminal device can correctly receive the information. The data of the terminal device may be sent at a high bit rate to improve spectral efficiency.

Specifically, the serving base station may send the downlink resource scheduling information by using the following signaling:

(1) A radio resource control (RRC) reconfiguration message. The RRC reconfiguration message may include resource scheduling information of a plurality of cells, and is applicable to a scenario in which a plurality of cells have relatively strong interference. However, the RRC message needs to be subject to a two-layer reliability protection mechanism with an automatic repeat request (ARQ) and a hybrid automatic repeat request (HARQ), may have a relatively long latency, and is suitable only for notifying semi-static scheduling of neighboring cell resource scheduling information.

(2) A media access control element (MAC CE) indication message. The MAC CE only experiences a HARQ process, has a relatively short latency, and may be used as a carrier of dynamic resource scheduling information of a neighboring cell.

(3) A downlink control information (DCI) indication message. The DCI is control information of a physical layer, and is characterized by high reliability and low latency. Currently, a terminal device blindly detects, by using a C-RNTI, whether resource scheduling information indicated by a serving base station exists. The serving base station may allocate, to the terminal device, an interfering cell radio network temporary identifier (I-RNTI) specially used to detect neighboring cell scheduling information. In each transmission timing interval (TTI), the terminal device may use an original C-RNTI and an original I-RNTI to detect resource scheduling information. If the resource scheduling information is detected by using the I-RNTI, it is considered that the resource scheduling information is the resource scheduling information of the neighboring cell and may be used to perform interference cancellation. In one embodiment, the serving base station may instruct the terminal device to detect a neighboring cell interference message by using the C-RNTI, and correspondingly, indicates, in the DCI, that the resource scheduling information is resource scheduling information of the neighboring cell.

Embodiment 2

Embodiment 2 is an uplink interference cancellation solution.

Figure 5:
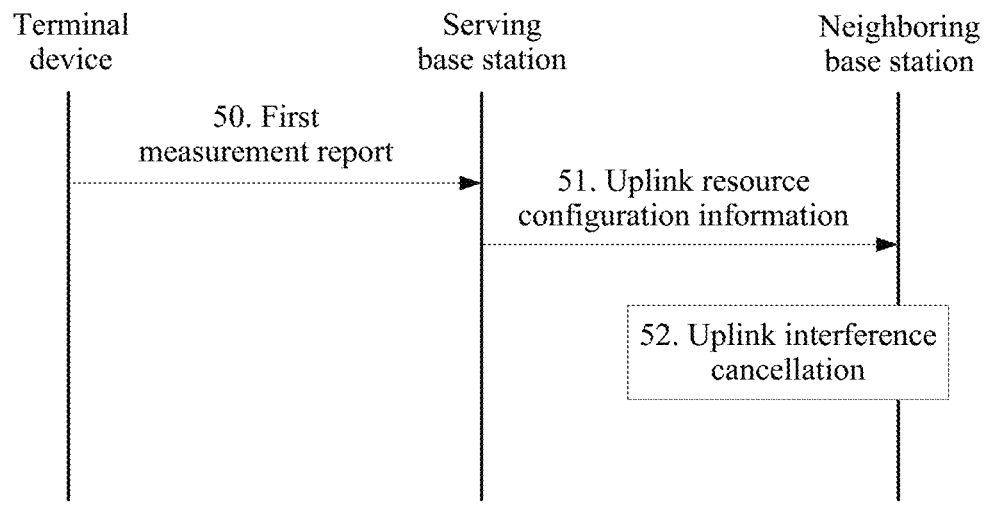
FIG. 5 is a signal flow diagram of a signal processing method for uplink interference cancellation.

Referring to FIG. 5, a specific procedure includes the following operations.

Operation 50: The terminal device measures a reference signal of at least one cell to obtain signal quality of the at least one cell, and reports the signal quality to a serving base station by using the first measurement report.

The first measurement report includes a PCI or a CGI, and downlink signal quality of the cell. In one embodiment, the downlink signal quality may be an RSRP, an RSRQ, or the like. In one embodiment, the first measurement report includes level information or signal quality of at least one cell, and a correspondence between the signal quality and the level information is preset, or a correspondence is received by the terminal device from the serving base station.

Operation 51: After receiving the first measurement report, the serving base station determines, based on signal quality of at least one cell included in the first measurement report, whether strong interference exists in each cell. If there is a strong interfering cell, uplink resource configuration information including uplink data scheduling information and/or reference signal configuration information is sent to a neighboring base station to which the strong interfering cell belongs.

Operation 52: The neighboring base station receives the uplink resource configuration information and performs uplink interference cancellation.

Figure 6:
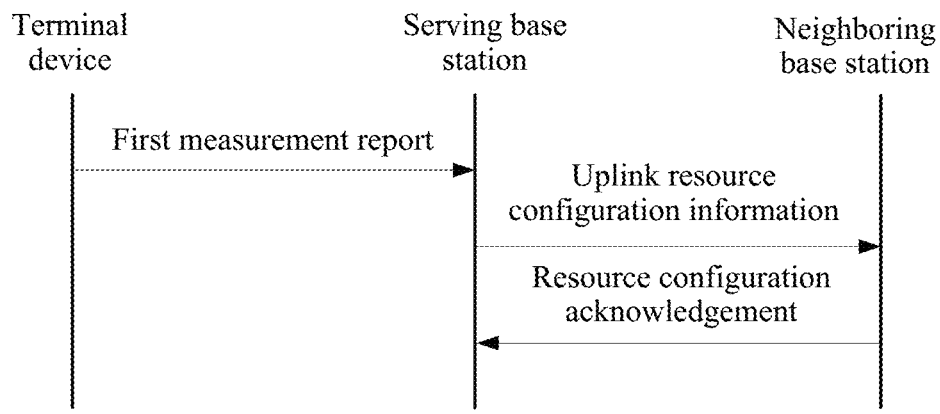
FIG. 6 is a signal flow diagram of a signal processing method according to an embodiment of this application.

To ensure an interference cancellation effect, in one embodiment, as long as the terminal device has uplink data to be sent, the serving base station may send the uplink resource configuration information of the terminal device to the neighboring base station, and the neighboring base station instructs, by using a resource configuration acknowledgement message, the serving base station to receive the resource configuration information of the terminal device. Refer to FIG. 6.

Figure 7:
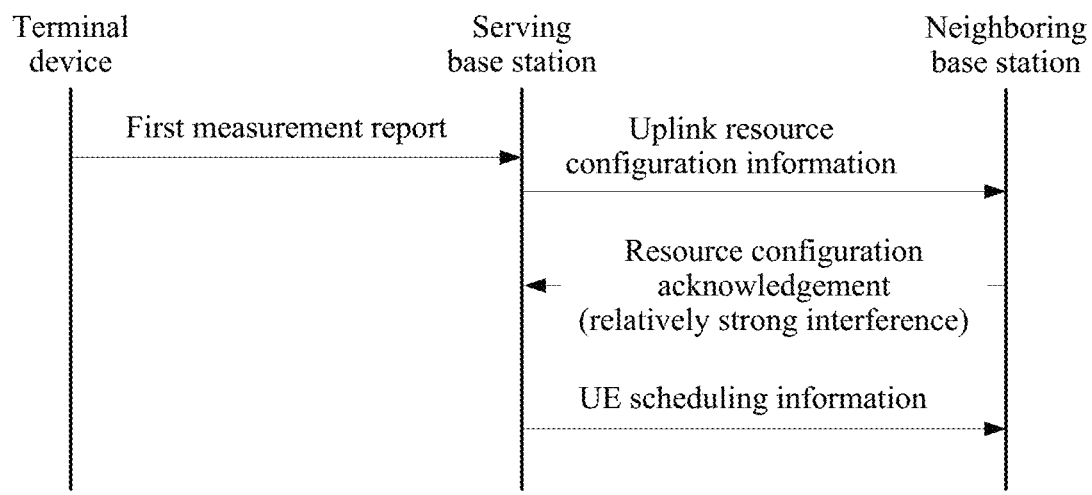
FIG. 7 is a signal flow diagram of a signal processing method according to an embodiment of this application.

When signal quality of a cell reported by the terminal device is relatively high and strongly interfered, the serving base station may first provide uplink resource configuration information of a single terminal device to the neighboring base station, and the neighboring base station may detect, by using the information, whether a relatively strong uplink signal of a terminal device can be received. If detected signal energy of the terminal device is relatively low, a resource configuration acknowledgement may indicate, to the serving base station, that interference of the terminal device is relatively weak, and the uplink resource configuration information of the terminal device does not need to be provided; if detected signal energy of the terminal device is relatively strong, the resource configuration acknowledgement may indicate, to the serving base station, that interference of the terminal device is relatively strong, and the uplink resource configuration information of the terminal device needs to be further provided for interference cancellation. Refer to FIG. 7.

Figure 8:
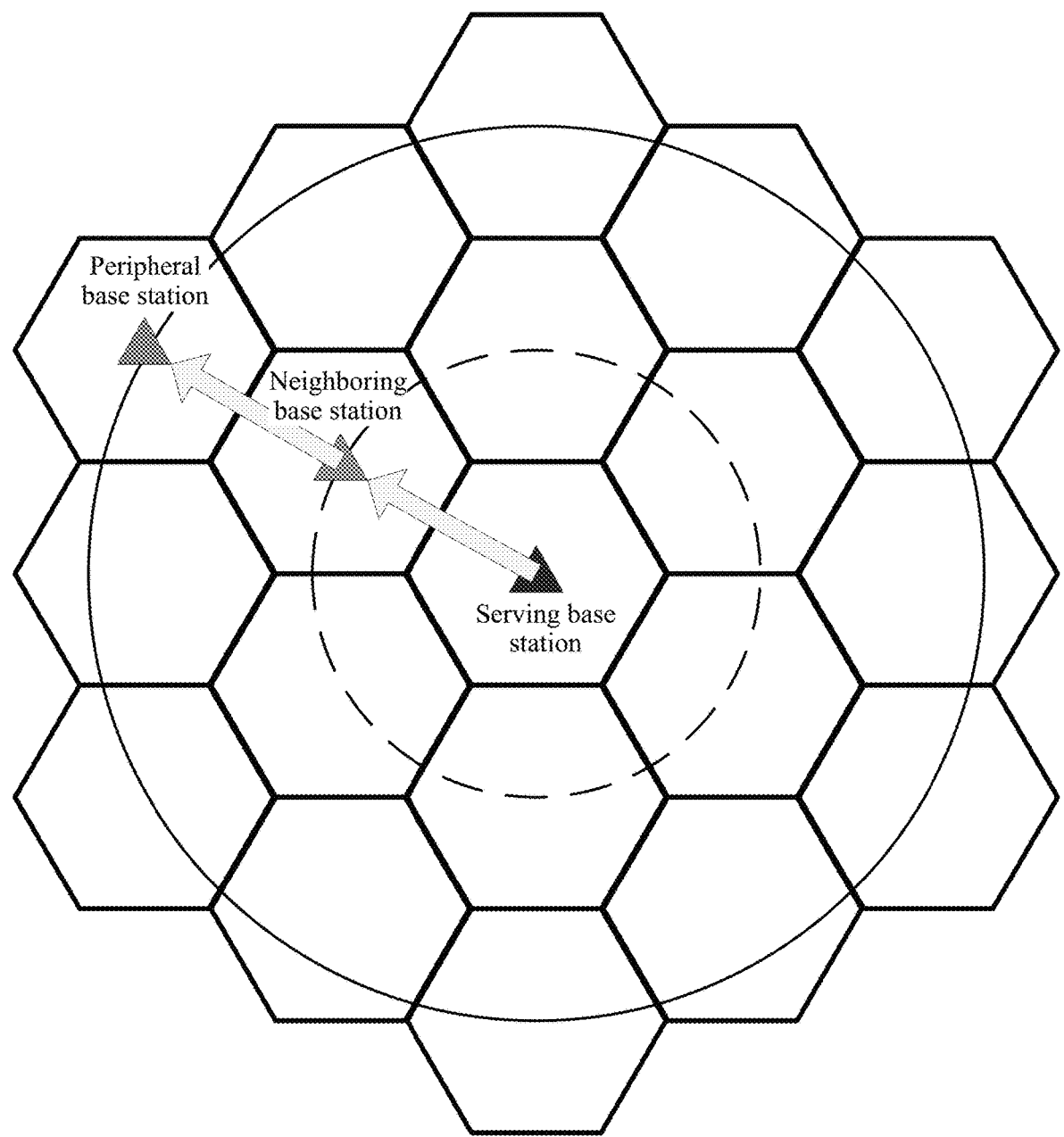
FIG. 8 is a schematic diagram of a base station location relationship according to an embodiment of this application.

In Embodiment 2, the serving base station and the neighboring base station exchange the resource configuration information of the terminal device, including uplink data scheduling information and uplink reference signal configuration information, to perform uplink interference cancellation. However, after a height of the terminal device is increased, not only the neighboring base station, but also a base station farther away from the terminal device is interfered with by the terminal device, and therefore interference cancellation also needs to be considered. Therefore, a transmission range of the resource configuration information needs to be extended. As shown in FIG. 8, a base station at a central location is a serving base station in which a terminal device is located, a first ring of base stations adjacent to the serving base station are neighboring base stations, namely, second base stations, and a second ring of base stations adjacent to the neighboring base stations are peripheral base stations, namely, third base stations. When the terminal device is on the ground, a maximum interference range of the terminal device reaches the neighboring base stations, namely, the first ring of base stations. When the height of the terminal device is higher than that of the serving base station, the interference impact range of the terminal device is extended to the peripheral base stations, namely, the second ring of base stations.

Specifically, the serving base station sends the first measurement report reported by the terminal device to the neighboring base station when sending the uplink resource configuration information of the terminal device to the neighboring base station. If the neighboring base station determines, by using the measurement report, that the cell of the peripheral base station of the neighboring base station also causes relatively strong interference to the terminal device, the neighboring base station further sends the uplink resource configuration information of the terminal device to the peripheral base station, to perform uplink interference cancellation.

Based on a same concept, an embodiment of this application further provides a terminal device, and the terminal device is configured to perform an action or a function of the terminal device in the foregoing method embodiments.

Based on a same concept, an embodiment of this application further provides a first base station, and the first base station is configured to perform an action or a function of the first base station or the serving base station in the foregoing method embodiments.

Based on a same concept, an embodiment of this application further provides a second base station, and the second base station is configured to perform an action or a function of the second base station or the neighboring base station in the foregoing method embodiments.

An embodiment of the present invention further provides a communications system, including the first base station, the second base station, and the terminal device in the foregoing embodiments.

For brevity, for details about an apparatus part, refer to the method embodiment. No repeated description is provided.

Figure 9A:
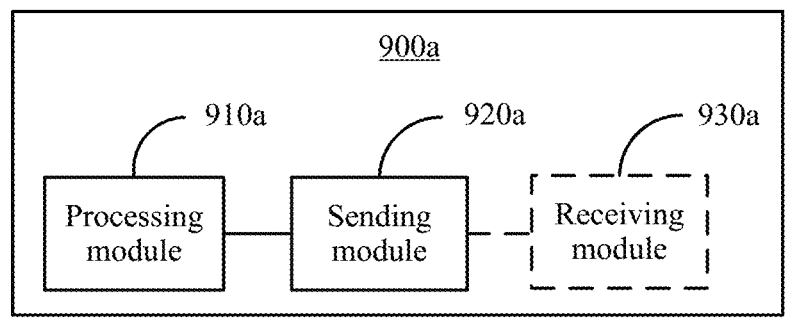
FIG. 9a is a schematic structural diagram of a terminal device according to an embodiment of this application.

As shown in FIG. 9a, a terminal device 900a in an embodiment of this application includes a sending module 920a and a processing module 910a, where the processing module 910a is configured to measure signal quality of one or more cells, to generate a first measurement report; the sending module 920a is configured to send the first measurement report to a first base station, where the first measurement report includes measurement information of the one or more cells.

In one embodiment, the processing module 910a is specifically configured to:

generate the first measurement report based on measurement report configuration information, where the measurement report configuration information includes at least one signal quality level.

In one embodiment, the measurement report configuration information further includes a signal quality range corresponding to each of the at least one signal quality level and/or level configuration information corresponding to each of the at least one signal quality level, and the level configuration information is used to indicate measurement information that needs to be reported.

In one embodiment, the measurement report configuration information is received by the terminal device from the first base station, or the measurement report configuration information is preconfigured.

In one embodiment, the measurement information includes any one of a signal quality level and signal quality.

A correspondence between the signal quality and the signal quality level is preset, or a correspondence is received by the terminal device from the first base station.

In one embodiment, the first measurement report further includes a cell quantity and/or a cell ID corresponding to each signal quality level.

In one embodiment, the terminal device further includes a receiving module 930a, configured to:

receive first downlink scheduling information from the first base station; and the processing module 910a is further configured to determine the first downlink scheduling information by using first identification information, where the first downlink scheduling information is scheduling information of a neighboring cell, the first identification information is received by the receiving module 930a from the first base station, or the first identification information is determined by the processing module 910a based on indication information received from the first base station.

In one embodiment, the processing module 910a is specifically configured to:

detect the first identification information on a control channel, to determine the first downlink scheduling information.

For all possible implementations of the terminal device 900a in this embodiment of this application, refer to all possible implementations of the terminal device in the embodiments of this application.

Figure 9B:
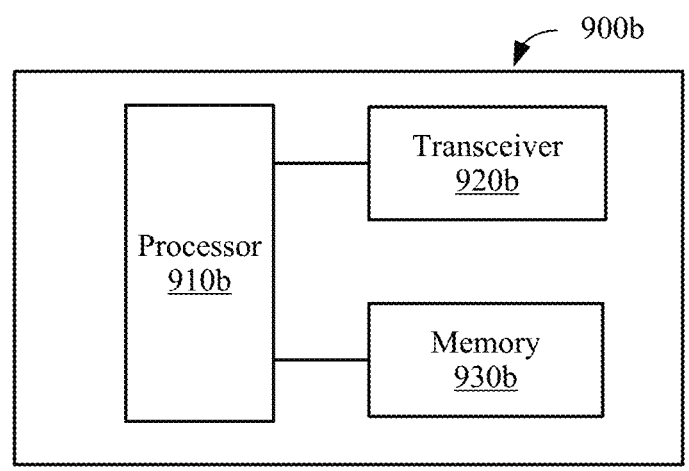
FIG. 9b is a schematic structural diagram of hardware of a terminal device according to an embodiment of this application.

It should be noted that, in this embodiment of this application, the processing module 910a may be implemented by a processor, and the sending module 920a and the receiving module 930a may be implemented by a transceiver. As shown in FIG. 9b, a terminal device 900b may include a processor 910b, a transceiver 920b, and a memory 930b. The memory 930b may be configured to store a program/code preloaded when the terminal device 900b is delivered from a factory, or may store code to be executed by the processor 910b, or the like.

The processor 910b may be a general-purpose CPU, a microprocessor, an ASIC, or one or more integrated circuits, and is configured to perform a related operation, to implement the technical solution provided in this embodiment of this application.

It should be noted that although only the processor 910b, the transceiver 920b, and the memory 930b are shown for the terminal device 900b shown in FIG. 9b, in a specific implementation process, a person skilled in the art should understand that the terminal device 900b further includes another component necessary for normal running. In addition, according to a specific requirement, a person skilled in the art should understand that the terminal device 900b may further include hardware components for implementing other additional functions. In addition, a person skilled in the art should understand that the terminal device 900b may include only components or modules necessary for implementing this embodiment of this application, but does not necessarily include all the components shown in FIG. 9b.

A person of ordinary skill in the art may understand that all or some of the processes of the methods in the embodiments may be implemented by a computer program instructing related hardware. The program may be stored in a computer readable storage medium. When being executed, the program may include the processes of the foregoing method embodiments. The storage medium may be a magnetic disk, an optical disc, a ROM, a RAM, or the like.

Figure 10A:
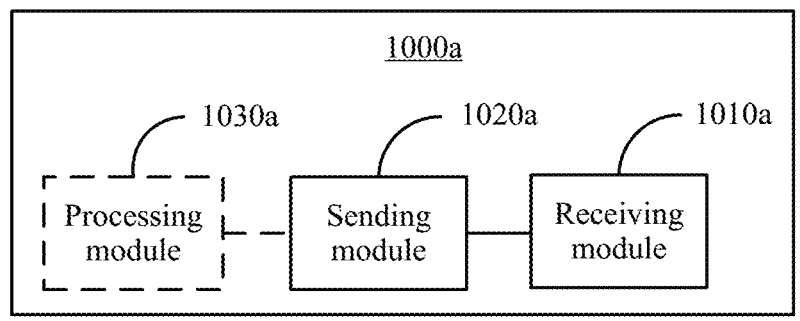
FIG. 10a is a schematic structural diagram of a first base station according to an embodiment of this application.

As shown in FIG. 10a, a first base station 1000a in an embodiment of this application includes a receiving module 1010a and a sending module 1020a. The receiving module 1010a is configured to receive a first measurement report from a terminal device, where the first measurement report includes measurement information of one or more cells. The sending module 1020a is configured to send the first measurement report to a second base station, where the second base station is a neighboring base station of the first base station.

In one embodiment, the sending module 1020a is further configured to:

send uplink resource configuration information to the second base station, where the uplink resource configuration information includes at least one of resource block RB location information, a modulation and coding scheme MCS, and a frequency hopping indication.

In one embodiment, the sending module 1020a is further configured to:

send a resource scheduling request to the second base station, where the resource scheduling request is used to request downlink resource scheduling information from the second base station; and receive first downlink resource scheduling information from the second base station.

In one embodiment, the sending module 1020a is further configured to:

send the first downlink resource scheduling information to the terminal device, where the first downlink resource scheduling information includes downlink resource scheduling information of the second base station.

In one embodiment, the first downlink resource scheduling information further includes downlink resource scheduling information of a third base station, and the third base station is determined by the second base station based on the first measurement report.

In one embodiment, the first base station further includes a processing module 1030a, configured to:

determine the second base station based on the first measurement report.

In one embodiment, the processing module 1030a is specifically configured to:

determine at least one cell of the one or more cells based on the first measurement report; and determine the second base station based on the at least one cell.

In one embodiment, the measurement information includes any one of a signal quality level and signal quality; and a correspondence between the signal quality and the signal quality level is preset, or a correspondence is received by the terminal device from the first base station.

In one embodiment, the first measurement report further includes a cell quantity and/or a cell ID corresponding to each signal quality level.

Figure 10B:
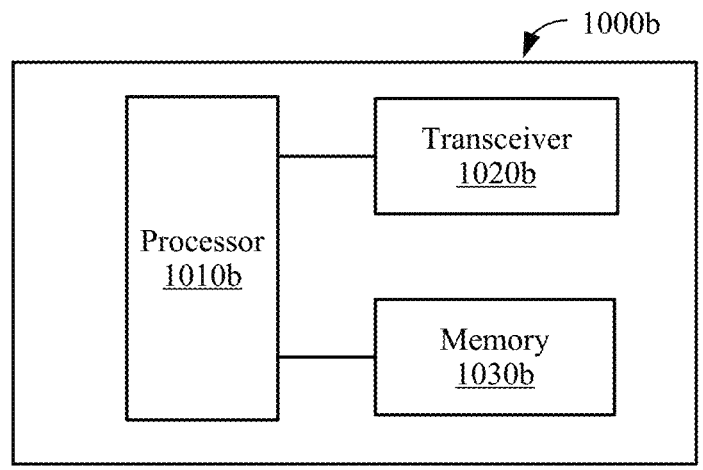
FIG. 10b is a schematic structural diagram of hardware of a first base station according to an embodiment of this application.

It should be noted that, in this embodiment of this application, the processing module 1030a may be implemented by a processor, and the sending module 1020a and the receiving module 1010a may be implemented by a transceiver. As shown in FIG. 10b, a first base station 1000b may include a processor 1010b, a transceiver 1020b, and a memory 1030b. The memory 1030b may be configured to store a program/code preloaded when the first base station 1000b is delivered from a factory, or may store code to be executed by the processor 1010b, or the like.

The processor 1010b may be a general-purpose central processing unit (CPU), a microprocessor, an application-specific integrated circuit (ASIC), or one or more integrated circuits, and is configured to perform a related operation, to implement technical solutions provided in the embodiments of this application.

It should be noted that although only the processor 1010b, the transceiver 1020b, and the memory 1030b are shown for the first base station 1000b shown in FIG. 10b, in a specific implementation process, a person skilled in the art should understand that the first base station 1000b further includes another component necessary for normal running. In addition, according to a specific requirement, a person skilled in the art should understand that the first base station 1000b may further include hardware components for implementing other additional functions. In addition, a person skilled in the art should understand that the first base station 1000b may include only components or modules necessary for implementing this embodiment of this application, but does not necessarily include all the components shown in FIG. 10b.

A person of ordinary skill in the art may understand that all or some of the processes of the methods in the embodiments may be implemented by a computer program instructing related hardware. The program may be stored in a computer readable storage medium. When being executed, the program may include the processes of the method embodiments. The foregoing storage medium may be a magnetic disk, an optical disc, a read-only memory (ROM), a random access memory (RAM), or the like.

Figure 11A:
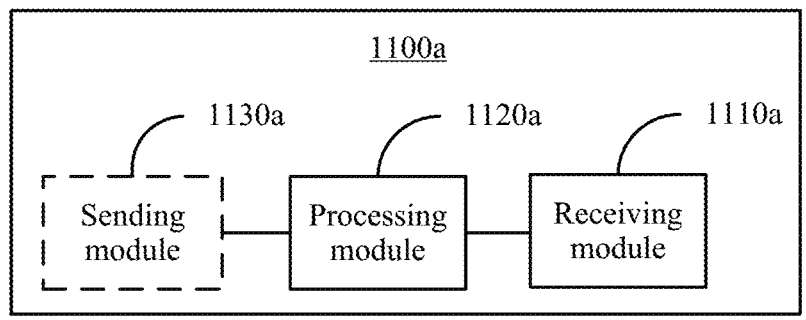
FIG. 11a is a schematic structural diagram of a second base station according to an embodiment of this application.

As shown in FIG. 11a, a second base station 1100a in an embodiment of this application includes a receiving module 1110a and a processing module 1120a. The receiving module 1110a is configured to receive a first measurement report from the first base station, where the first measurement report includes measurement information of at least one cell, and the second base station is a neighboring base station of the first base station. The processing module 1120a is configured to determine at least one third base station based on the first measurement report.

In one embodiment, the first measurement report includes signal quality of at least one cell, and the processing module 1120a is specifically configured to:
determine at least one cell whose signal quality exceeds a preset threshold as a target cell; and
determine a base station of the target cell as a third base station.

In one embodiment, the first measurement report includes a signal quality level of at least one cell, and the processing module 1120a is specifically configured to:
determine at least one cell whose signal quality level exceeds a preset threshold as a target cell; and
determine a base station of the target cell as a third base station.

In one embodiment, the receiving module 1110a is further configured to:
receive uplink resource configuration information from the first base station, where the uplink resource configuration information is reference signal configuration information or uplink data scheduling information; and
the second base station further includes a sending module 1130a, configured to send the uplink resource configuration information to the third base station.

In one embodiment, the receiving module 1110a is further configured to:
receive a resource scheduling request from the first base station, where the resource scheduling request is used to request downlink resource scheduling information; and
the sending module 1130a is further configured to send downlink resource scheduling information of the second base station and/or downlink resource scheduling information of the third base station to the first base station.

Figure 11B:
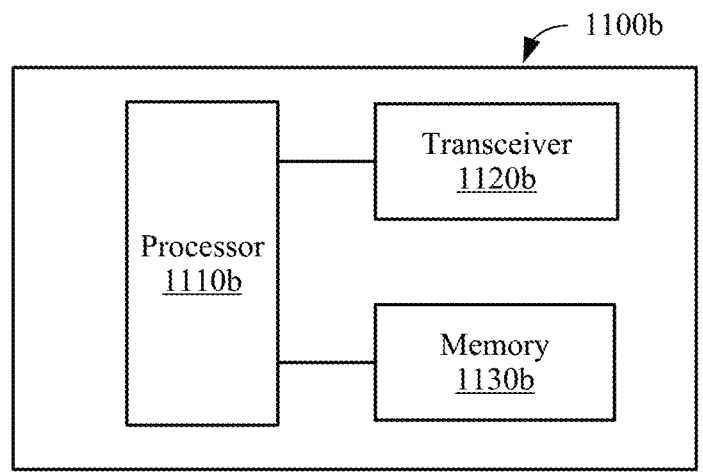
FIG. 11b is a schematic structural diagram of hardware of a second base station according to an embodiment of this application.

It should be noted that, in this embodiment of this application, the processing module 1120a may be implemented by a processor, and the sending module 1130a and the receiving module 1110a may be implemented by a transceiver. As shown in FIG. 11b, a second base station 1100b may include a processor 1110b, a transceiver 1120b, and a memory 1130b. The memory 1130b may be configured to store a program/code preloaded when the second base station 1100b is delivered from a factory, or may store code to be executed by the processor 1110b, or the like.

The processor 1110b may be a general-purpose central processing unit (CPU), a microprocessor, an application-specific integrated circuit (ASIC), or one or more integrated circuits, and is configured to perform a related operation, to implement technical solutions provided in the embodiments of this application.

It should be noted that although only the processor 1110b, the transceiver 1120b, and the memory 1130b are shown for the second base station 1100b shown in FIG. 11b, in a specific implementation process, a person skilled in the art should understand that the second base station 1100b further includes another component necessary for normal running. In addition, according to a specific requirement, a person skilled in the art should understand that the second base station 1100b may further include hardware components for implementing other additional functions. In addition, a person skilled in the art should understand that the second base station 1100b may include only components or modules necessary for implementing this embodiment of this application, but does not necessarily include all the components shown in FIG. 10b.

A person of ordinary skill in the art may understand that all or some of the processes of the methods in the embodiments may be implemented by a computer program instructing related hardware. The program may be stored in a computer readable storage medium. When being executed, the program may include the processes of the method embodiments. The foregoing storage medium may be a magnetic disk, an optical disc, a read-only memory (ROM), a random access memory (RAM), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A signal processing method, comprising:
   receiving, by a first base station, a first measurement report from a terminal device, wherein the first measurement report comprises measurement information of signals received by the terminal device from one or more cells;
   sending, by the first base station, the first measurement report to a second base station; and
   sending, by the first base station, uplink resource configuration information of the terminal device to the second base station, wherein the uplink resource configuration information of the terminal device comprises at least one of resource block (RB) location information, a modulation and coding scheme (MCS), or a frequency hopping indication for use by the terminal device for uplink transmission; and
   wherein the second base station determines at least one third base station based on the first measurement report and sends the uplink resource configuration information of the terminal device to the at least one third base station.

2. The method according to claim 1, wherein the method further comprises:
   sending, by the first base station, a resource scheduling request to the second base station, wherein the resource scheduling request is used to request downlink resource scheduling information from the second base station; and
   receiving, by the first base station, first downlink resource scheduling information from the second base station.

3. The method according to claim 2, wherein the method further comprises:
   sending, by the first base station, the first downlink resource scheduling information to the terminal device, wherein the first downlink resource scheduling information comprises downlink resource scheduling information of the second base station.

4. The method according to claim 3, wherein the first downlink resource scheduling information further comprises downlink resource scheduling information of a third base station, and the third base station is determined by the second base station based on the first measurement report.

5. The method according to claim 1, wherein the method further comprises:
   determining, by the first base station, the second base station based on the first measurement report.

6. The method according to claim 5, further comprising:
   determining, by the first base station, at least one cell of the one or more cells based on the first measurement report; and
   determining, by the first base station, the second base station based on the at least one cell.

7. The method according to claim 1, wherein the measurement information comprises any one of a signal quality level and a signal quality, and wherein
   a correspondence between the signal quality and the signal quality level is preset, or the correspondence is received by the terminal device from the first base station.

8. The method according to claim 7, wherein the first measurement report further comprises at least one of a cell quantity or a cell ID corresponding to each signal quality level.

9. A signal processing method, comprising:
   receiving, by a second base station, a first measurement report from a first base station, wherein the first measurement report comprises measurement information obtained by a first terminal device by measuring signals received from one or more cells;
   determining, by the second base station, at least one third base station based on the first measurement report, wherein the first base station is a serving base station of the first terminal device;
   receiving, by the second base station, uplink resource configuration information of the terminal device from the first base station, wherein the uplink resource configuration information of the terminal device comprises at least one of resource block (RB) location information, a modulation and coding scheme (MCS), or a frequency hopping indication for use by the terminal device for uplink transmission; and
   sending, by the second base station, the uplink resource configuration information of the terminal device to the at least one third base station.

10. The method according to claim 9, wherein the first measurement report comprises a signal quality level of the one or more cells, and wherein determining, by the second base station, at least one third base station based on the first measurement report comprises:
    determining, by the second base station, at least one of the one or more cells whose signal quality level exceeds a preset threshold as a target cell; and determining, by the second base station, a base station of the target cell as one of the at least one third base station.

11. The method according to claim 9, wherein the method further comprises:
receiving, by the second base station, a resource scheduling request from the first base station, wherein the resource scheduling request is used to request downlink resource scheduling information; and
sending, by the second base station, at least one of downlink resource scheduling information of the second base station or downlink resource scheduling information of the at least one third base station to the first base station.

12. An apparatus, comprising:
one or more processors, and
a non-transitory storage medium configured to store program instructions,
wherein, when executed by the one or more processors, the instructions cause the apparatus to:
measure signal quality of signals received from one or more cells to generate a first measurement report; and
send the first measurement report to a first base station, wherein the first measurement report comprises measurement information of the signals received from the one or more cells;
wherein the first base station sends the first measurement report and uplink resource configuration information of the apparatus to a second base station, the uplink resource configuration information of the apparatus comprising at least one of resource block (RB) location information, a modulation and coding scheme (MCS), or a frequency hopping indication for use by the apparatus for uplink transmission; and
wherein the second base station determines at least one third base station based on the first measurement report and sends the uplink resource configuration information of the apparatus to the at least one third base station.

13. The apparatus according to claim 12, wherein the instructions further cause the apparatus to:
generate the first measurement report based on measurement report configuration information, wherein the measurement report configuration information comprises at least one signal quality level.

14. The apparatus according to claim 13, wherein the measurement report configuration information further comprises at least one of a signal quality range corresponding to each of the at least one signal quality level or level configuration information corresponding to each of the at least one signal quality level, and wherein the level configuration information is used to indicate the measurement information to be reported.

15. The apparatus according to claim 13, wherein the measurement report configuration information is received by the apparatus from the first base station, or the measurement report configuration information is preconfigured.

16. The apparatus according to claim 12, wherein the measurement information comprises any one of a signal quality level and a signal quality, and wherein
a correspondence between the signal quality and the signal quality level is preset, or the correspondence is received by the apparatus from the first base station.

17. The apparatus according to claim 12, wherein the instructions further cause the apparatus to:
receive first downlink scheduling information from the first base station; or
determine the first downlink scheduling information by using first identification information, wherein the first downlink scheduling information is scheduling information of a neighboring cell, and wherein the first identification information is received by the apparatus from the first base station, or the first identification information is determined by the apparatus based on indication information received from the first base station.

* * * * *